(12) United States Patent
Hawkins et al.

(10) Patent No.: US 6,874,756 B2
(45) Date of Patent: Apr. 5, 2005

(54) SNAP ASSEMBLY ACTUATOR HOUSING AND VALVE MOUNTING BRACKET

(75) Inventors: Darin Hawkins, Burton, OH (US); George Carlson, Ravenna, OH (US); David R. Kattler, Mantua, OH (US)

(73) Assignee: Swagelok Company, Solon, OH (US)

( * ) Notice: Subject to any disclaimer, the term of this patent is extended or adjusted under 35 U.S.C. 154(b) by 149 days.

(21) Appl. No.: 10/132,458

(22) Filed: Apr. 25, 2002

(65) Prior Publication Data

US 2003/0030021 A1 Feb. 13, 2003

Related U.S. Application Data

(60) Provisional application No. 60/287,544, filed on Apr. 30, 2001, and provisional application No. 60/286,505, filed on Apr. 26, 2001.

(51) Int. Cl.[7] ............................................. F16K 31/00
(52) U.S. Cl. ..................... 251/291; 137/884; 137/553; 251/367
(58) Field of Search ................................ 251/291, 292, 251/367; 137/269, 271, 884, 553, 551; 285/921

(56) References Cited

U.S. PATENT DOCUMENTS

| | | | |
|---|---|---|---|
| 2,064,751 A | | 12/1936 | Hussman |
| 3,036,375 A | | 5/1962 | Schlosser, Jr. et al. |
| 3,409,859 A | * | 11/1968 | Krehbiel ..................... 403/326 |
| 3,493,201 A | | 2/1970 | Marran |
| 3,754,843 A | | 8/1973 | Dernedde et al. |
| 4,095,863 A | * | 6/1978 | Hardin ........................ 137/269 |
| 4,246,712 A | * | 1/1981 | Vander Wall ................ 40/316 |
| 4,354,655 A | | 10/1982 | Hengst |
| 4,502,656 A | | 3/1985 | Zeitler |
| 4,611,484 A | | 9/1986 | MacKissinger, Jr. et al. |
| 4,624,443 A | | 11/1986 | Eidsmore |
| 4,734,016 A | | 3/1988 | Sailer |
| 4,735,558 A | | 4/1988 | Kienholz et al. |
| 4,755,109 A | | 7/1988 | Botts |
| 4,776,554 A | | 10/1988 | Shekita et al. |
| 4,917,581 A | | 4/1990 | Richardson, Jr. et al. |
| 4,946,351 A | | 8/1990 | Richardson, Jr. |
| 5,044,526 A | | 9/1991 | Sasaki et al. |
| 5,044,883 A | | 9/1991 | Neueder |
| 5,107,897 A | * | 4/1992 | Stoll .......................... 137/884 |
| 5,333,647 A | | 8/1994 | Fukano et al. |
| 5,380,173 A | | 1/1995 | Hellstrom |
| 5,449,145 A | | 9/1995 | Wortrich |

(Continued)

FOREIGN PATENT DOCUMENTS

| | | |
|---|---|---|
| DE | 1211453 | 2/1966 |
| EP | 0846995 A2 | 6/1998 |
| EP | 0813010 B1 | 12/1998 |
| FR | 2557353 | 6/1985 |
| WO | WO 01/26196 A1 | 4/2001 |

OTHER PUBLICATIONS

Entegris Brochure, Entegris, Inc., Jan. 2000.
Advance Sav Series Catalog, Advance Electric Company, Inc.
CKD Catalog, CKD Corporation.

*Primary Examiner*—John Bastianelli
(74) *Attorney, Agent, or Firm*—Calfee, Halter & Griswold LLP

(57) ABSTRACT

A valve assembly including a valve, a mounting plate, a snap-together actuator, and a mounting bracket. The snap-together actuator is assembled by a set of snap wings that are attached to one piece of the actuator housing and inserted into slits in the other piece of the actuator housing. The actuator housing is then bolted to the valve and mounting plate. The mounting plate is received by the mounting bracket, which may be pre-mounted into place in the valve system. The mounting bracket contains a retaining clip and a snap wing that secures the valve mounting plate to the valve mounting bracket.

24 Claims, 8 Drawing Sheets

U.S. PATENT DOCUMENTS

| | | |
|---|---|---|
| 5,484,340 A | 1/1996 | Campbell et al. |
| 5,533,874 A | 7/1996 | Hauser |
| 5,555,647 A | 9/1996 | Torborg et al. |
| 5,927,688 A | 7/1999 | Lin |
| 6,035,893 A * | 3/2000 | Ohmi et al. ............... 137/884 |
| 6,045,340 A | 4/2000 | Batchelder et al. |
| 6,050,662 A | 4/2000 | Filipek et al. |
| 6,099,267 A | 8/2000 | Ames et al. |
| 6,123,320 A | 9/2000 | Rasanow et al. |
| 6,138,717 A * | 10/2000 | Meyer ...................... 137/884 |
| 6,269,834 B1 * | 8/2001 | Huhnen ..................... 137/884 |
| 6,287,090 B1 | 9/2001 | Hamasaki et al. |
| 2001/0035515 A1 | 11/2001 | Kennedy et al. |

* cited by examiner

SNAP ASSEMBLY ACTUATOR HOUSING AND VALVE MOUNTING BRACKET

CROSS-REFERENCE TO RELATED APPLICATION

This application claims priority to U.S. Provisional Application Ser. No. 60/286,505, filed Apr. 26, 2001, and U.S. Provisional Application Ser. No. 60/287,544, filed Apr. 30, 2001.

FIELD OF THE INVENTION

The present invention relates generally to a modular actuator valve and mounting arrangements, valve assembly, and more specifically to a snap assembly valve actuator housing and a modular valve mounting bracket arrangement. These two features may be used individually or combined.

BACKGROUND

When designing a fluid flow system that includes one or more valves, it is desirable to provide for easy installation of the valves. The installation of valves within a system may be a cumbersome process, especially when the design layout changes during installation. The prior art fluid flow systems typically have a number of valves that are placed throughout the system as the piping is laid out. As the designer builds the system, and modifications to the fluid flow path need to be made, the designer must redesign the layout thereby moving the placement of the valves. In addition, after the system is in place, it is commonly desirable to modify the piping by changing the fluid path, adding lines, subtracting lines, changing the position of instruments or ports, etc. In such cases, valves must be removed, relocated, or added. In the prior art, removing, adding, or relocating valves is a cumbersome process. In addition, valves frequently must be removed from the system for inspection, replacement or repair. Furthermore, the valves themselves may be difficult to install, remove, or replace, especially if different valve pieces require further assembly prior to or during installation.

Therefore, it is desired to provide a mounting bracket for a valve that may be easily pre-placed within the system and moved as desired or necessitated, and further provides for easy installation and replacement of the valve once it is installed. It is further desired to provide a valve actuator that may be stored in a pre-assembled manner so that installation of the valve is simplified.

SUMMARY OF THE INVENTION

A valve mounting bracket for securing a valve within a fluid flow system. In one embodiment, the valve mounting bracket has a mounting bracket base plate; a retaining clip, and a mechanism for securing a valve in a snap-together engagement. A snap wing located on the mounting bracket may be positioned to provide the snap-together engagement with a member located on the valve.

Another aspect of the present invention is a valve actuator housing that is secured in snap-together engagement. In one embodiment, the snap-together actuator housing has a first actuator housing, a mechanism associated with the first actuator housing for providing interlocking assembly of the first actuator housing with a second actuator housing, and an actuator located within the housing. A set of snap wings located on the first actuator housing may be positioned to provide the interlocking assembly between the first and second actuator housings.

Another aspect of present invention is a method of designing a fluid flow system. In one embodiment valve mounting brackets are positioned with a fluid flow system, and are secured therein. Valves are attached to each of the valve mounting brackets via a snap-together engagement mechanism, such as a snap wing positioned on the valve mounting bracket to engage a member located on the valve.

In one embodiment, the snap-together actuator housing, valve mounting bracket and method of designing a fluid flow system are used together to provide an easy to install, maintain, relocate, replace and repair valves within a fluid piping system. In other embodiments of the present invention, the valve mounting bracket, snap-together actuator housing, and method of designing a fluid flow system are used separately or in different combinations.

BRIEF DESCRIPTION OF THE FIGURES

In the accompanying drawings, which are incorporated in and constitute a part of this specification, embodiments of the invention are illustrated, which, together with a general description of the invention given above, and the detailed description given below serve to illustrate the principles of this invention.

DETAILED DESCRIPTION

Figure 1:
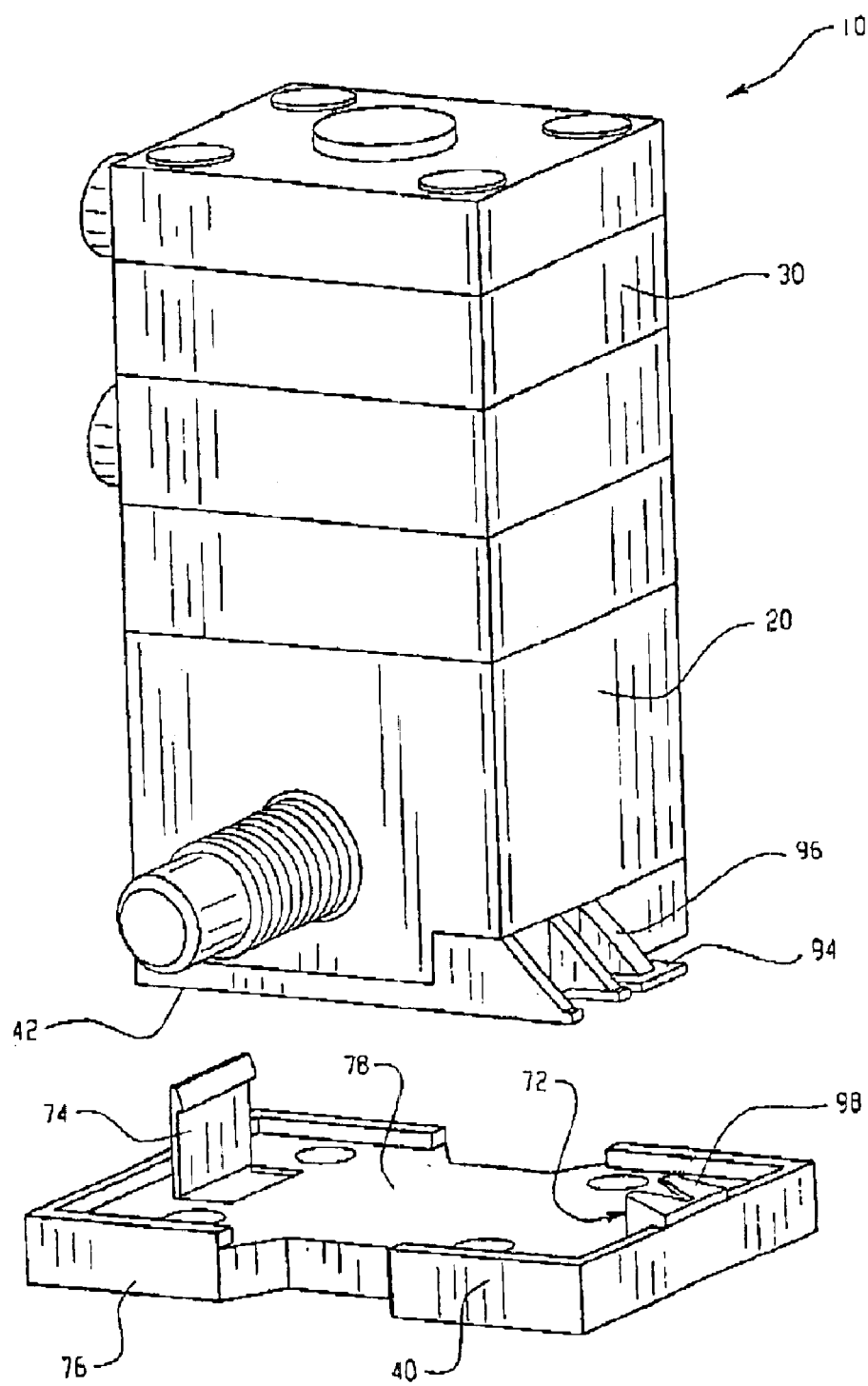
FIG. 1 is a perspective view of a valve assembly of the present invention.
Figure 2:
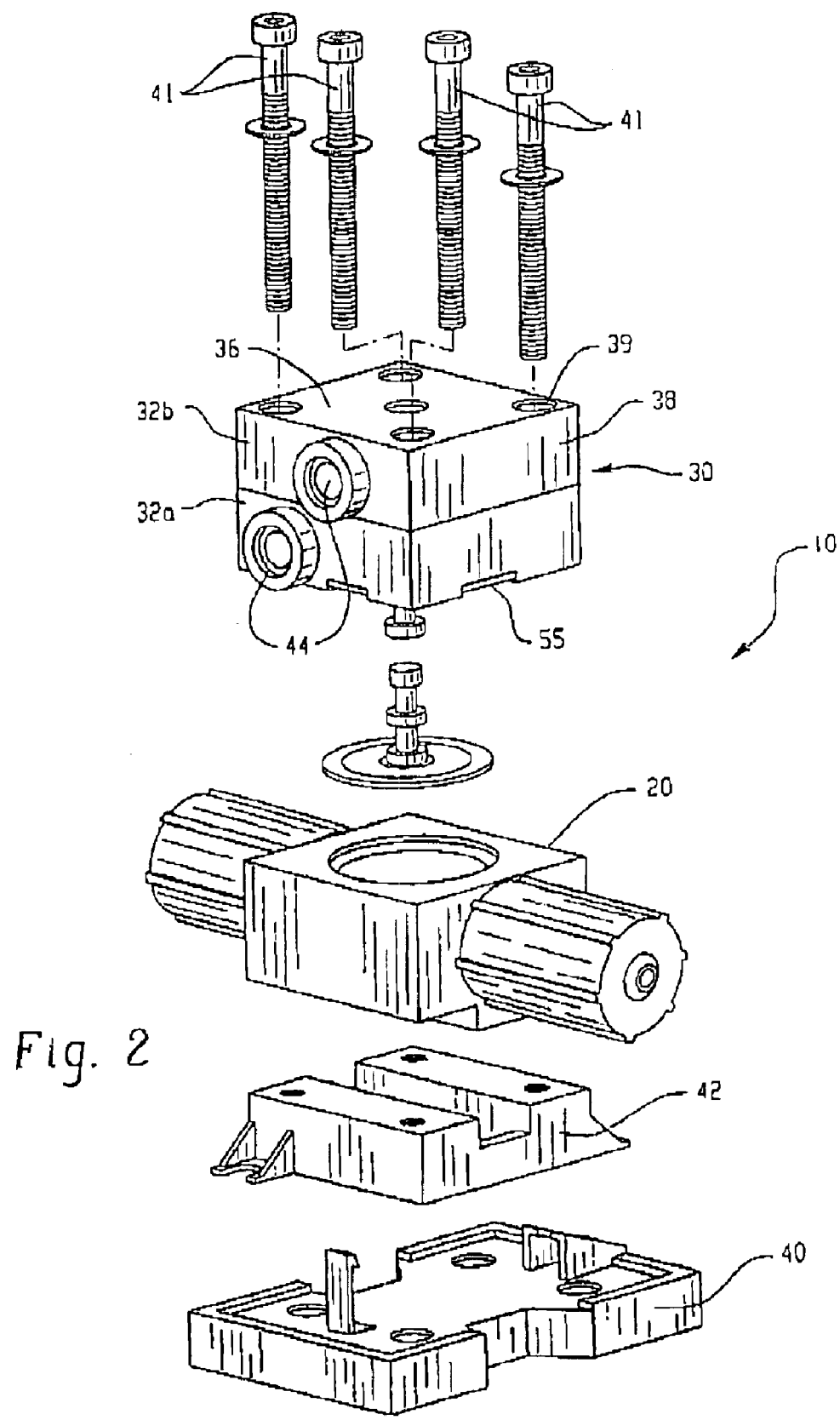
FIG. 2 is an exploded view of a valve assembly of the present invention.

With reference to FIG. 1, a valve assembly in accordance with the present invention, generally referenced as 10, provides for a valve body 20, an actuator assembly 30, and a valve mounting bracket 40. The valve body 20 may be any number of valves that are known to those skilled in the art. The Figures used to illustrate the invention generally show a radial diaphragm valve; however one skilled in the art would understand and appreciate incorporating the present invention into different valve body types and configurations.

In accordance with one aspect of the invention, an actuator housing is secured by an interlocking snap mechanism. In one embodiment, the actuator assembly 30 is a snap together assembly comprising a bottom housing 32a, a top housing 32b, and a mechanism for interlocking snap-assembly of the top and bottom housings 32a, 32b. In the illustrated embodiment this mechanism is realized in the form of two or more snap wings 34, four such snap wings 34a, 34b, 34c, and 34d are illustrated in the embodiment shown in FIG. 3. The actuator assembly further comprises an actuating means 35.

The top housing 32b has a top surface 36, a bottom surface 37, and side surfaces 38. The top surface 36 has a set of bolt holes 39 therethrough for receiving bolts 41 that secure the top housing 32b to the bottom housing 32a, and the actuator housing 32 to the valve body 20 and mounting plate 42 upon installation of the valve and actuator. The snap wings 34 secure the top housing 32b to the bottom housing 32a until the bolts are tightened, whereupon the pressure on the snap wings 34 is alleviated by the bolts 41.

Figure 3:
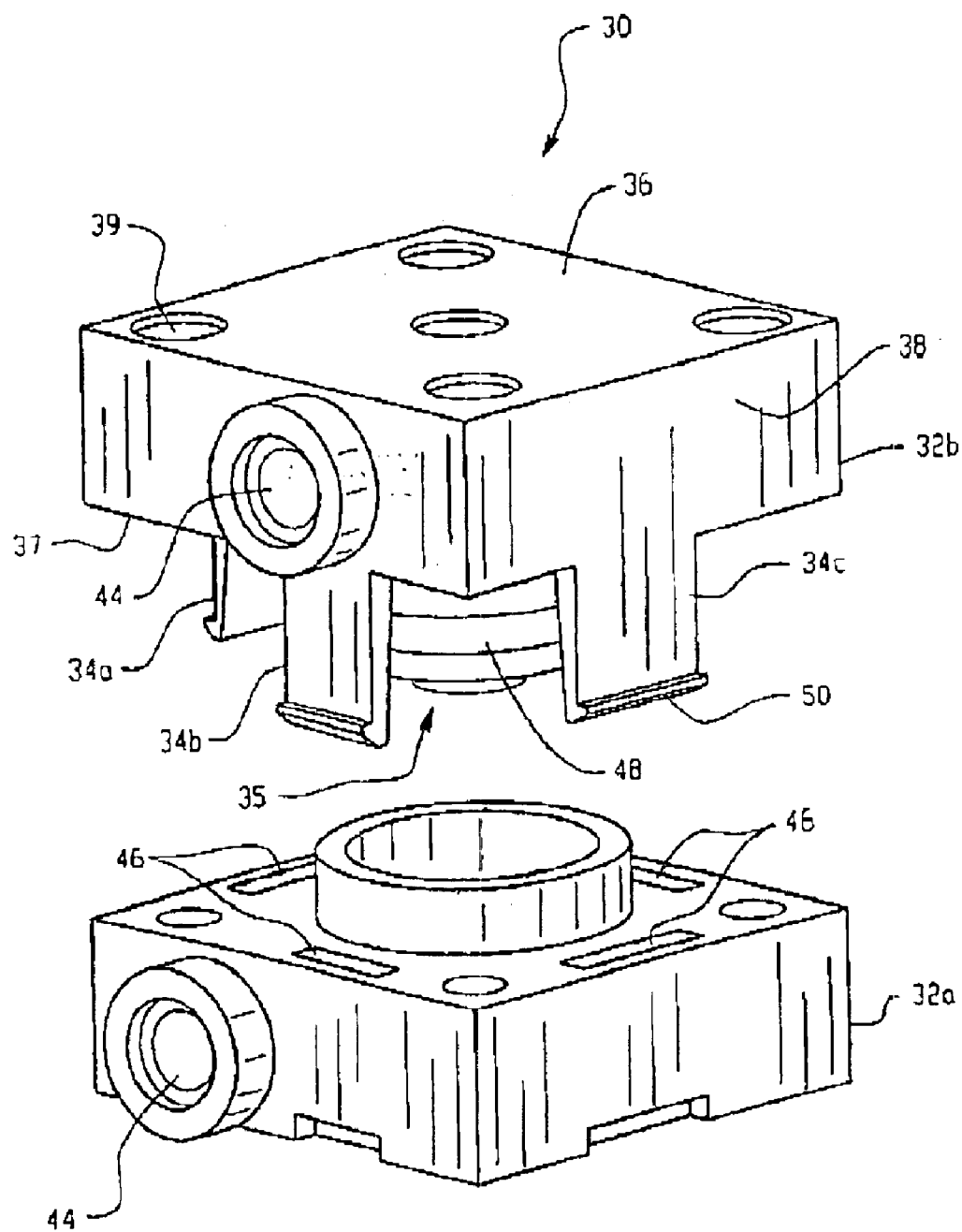
FIG. 3 is a perspective view of a snap-together valve actuator assembly.
Figure 4:
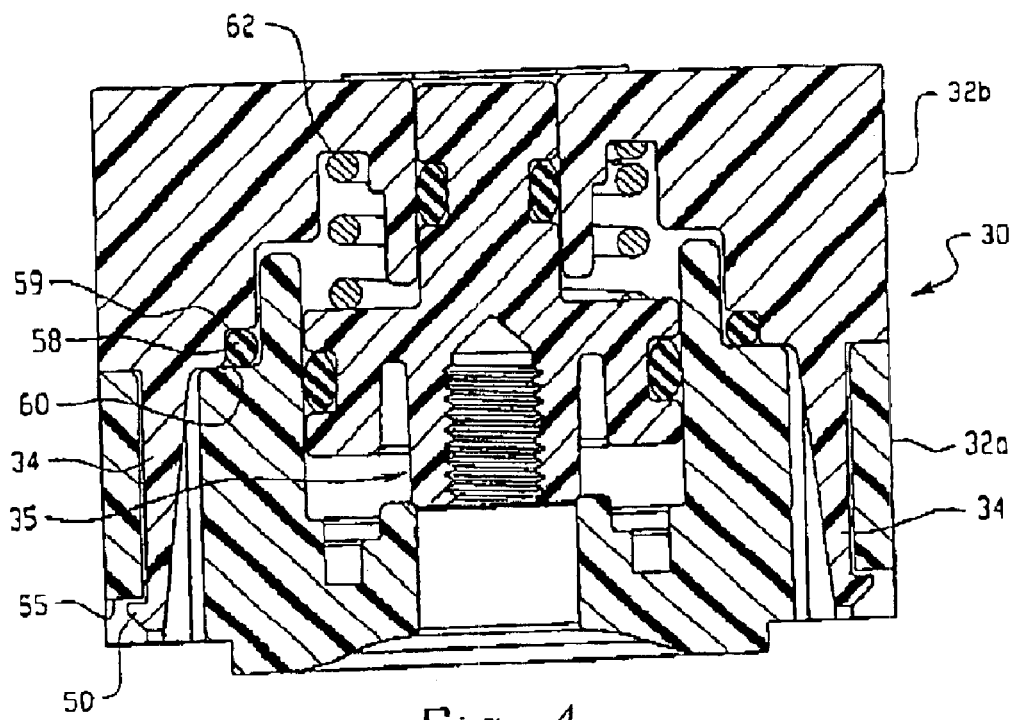
FIG. 4 is a cross-sectional view of a snap-together valve actuator assembly.

The actuator housing 32 contains one or more ports 44 that are generally placed along the sides of the actuator housing. The ports 44 provide access to and interact with the actuating means 35 as discussed in further detail below. In the embodiment shown in FIG. 3, the ports 44 are shown as two air inlets located on the sides of the actuator housing 32, one on either half of the housing, and are in fluid communication with a chamber having a cylinder piston 48 which acts as the actuating means 35. The ports 44 may take on a number of shapes, sizes and configurations. For example, the ports 44 shown in FIG. 3 are circular with a raised ridge for receipt of an air supply line. Furthermore, the ports 44 in FIG. 3 are staggered to accommodate the supply lines. One skilled in the art will appreciate that these ports may be lined up or spread further apart, and that they may be a number of different shapes and sizes depending on the size, location and type of supply line and the valve configuration. Further, as will be described in further detail below, the ports may be on opposite or adjacent sides of the actuator housing to accommodate the location of the supply lines.

The snap wings 34 are plastic tabs that protrude from the bottom surface of the top housing 32b and are received in slits 46 formed in the bottom housing. In one embodiment, the snap wings 34 are molded plastics tabs that are integral with the top housing 32b, however one skilled in the art would appreciate that the snap wings 34 may also be machined and/or non-integral to the top housing 32b. Furthermore, in one embodiment, the slits 46 are molded into the bottom housing 32a; however, the slits 46 may also be machined. The snap wings may be made of similar material as the actuator housing 32, for example polypropylene, perfluoroalkoxy, or polyvinylidenefluoride, or a different suitable material. The snap wings 34 are generally planar with a ridge 50 along the end portion 51 of the snap wings.

As the top housing 32b is brought together with the bottom housing 32a, the snap wings 34 are aligned with and received into the slits 46 on the bottom housing 32a. The snap wings 34 are angled outward towards the sides of the actuator housing, such as to provide contact between the snap wing 34 and the inner wall 52 of the corresponding slit 46 upon insertion of the snap wing. As the snap wings 34 are inserted further into the corresponding slits 46, the ridge 50 contacts the inner wall 52 and the snap wing 34 flexes inwardly. Once the ridge reaches surface 55 and the snap wings 34 snap outward toward the sides of the actuator housing, thereby securing the ridge 50 against surface 55 and locking the two housing portions together. In the embodiment shown in FIG. 6, the end of the snap wing 34 and the ridge 50 located thereon are connected by a beveled edge 56 to allow for easier insertion of the snap wing 34. The snap wings 34 are sized such that ridge 50 rests against or approximate to surface 55 when the top housing 32b contacts with the bottom housing 32a. In one embodiment the snap wing 34 is completed encased within the bottom housing 32a thereby providing for a permanent assembly of the actuator housing. It should be appreciated that a portion of the bottom actuator housing 32a may be cut away to provide access to the ridge 50 on the snap wing 34 to facilitate disassembly of the actuator housing. A suitable gasket, or other seal, 58 is placed along recess 59 in the top housing 32b to provide a seal against the bottom housing 32a at surface 60. It should be noted that the length of the snap wings may vary depending on the thickness of the actuator housing; however, longer snap wings are more flexible.

Figure 5:
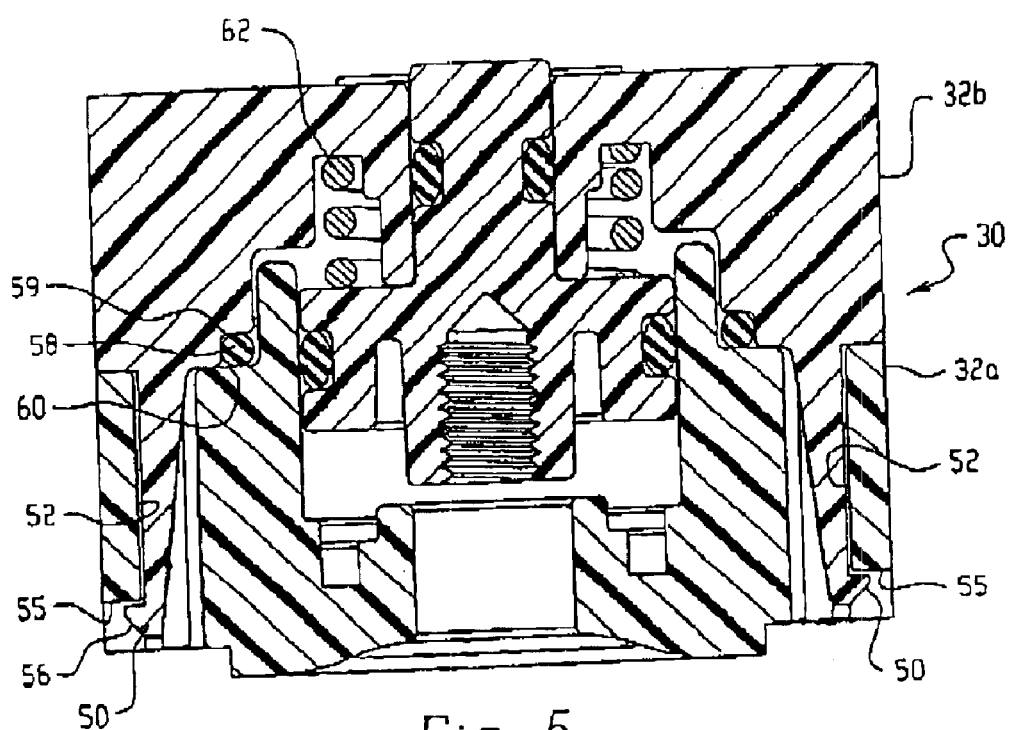
FIG. 5 is a cross-sectional view of a snap-together valve actuator assembly

While four snap wings are generally shown in the Figures, one skilled in the art would appreciate that more or less snap wings could be used. The number and strength of the snap wings need only be sufficient to secure the actuator housing portions together. In order to secure the actuator housing portions together, the snap wings should maintain their interlocking engagement against any expected opposing force exerted on the housing for a particular application. For example, as shown in FIG. 5, a spring 62 is used to provide a force against the actuator piston 48. Such force is subsequently transferred to the actuator housing and thus must be overcome in order to secure the actuator housing pieces together. Further, it may be desirable to enhance strength of the snap wings such that the actuator will remain together upon the addition of air pressure to the actuator.

The snap wings may be configured such as to provide for a one-way assembly, a two-way assembly, or a four-way assembly by adjusting the size, location and number of snap wings. For example, larger wings and smaller wings may be used in a given combination to designate a required or predetermined orientation for assembly. Further, offsetting the snap wings to one side further provides for the orientation of the assembly. In the embodiment shown in FIG. 3, small wings and large wings are employed in an every-other fashion wherein the offset of the large wings are complementary and the offset of the small wings are complementary This snap wing arrangement permits the actuator housing to be assembled with two different orientations, rotated 180° from one another. This permits the installation of actuator supply lines on either the same side of the actuator housing, or on opposite sides of the actuator housing, at the discretion of the installer. If one of the snap wings, along with its corresponding slit, were removed, or if the snap wings were offset to the same side (instead of opposite sides as shown in FIG. 3), the actuator housing could only be snapped-together in a single orientation, thereby fixing the location of the actuator supply lines. Alternatively, if all the snap wings are the same size with similar offsets, the actuator housing could be assembled in any one of four orientations, each separated by 90°.

Upon the assembly of a valve with an actuator, the actuator may be snapped-together and stored as a pre-assembly unit, thereby permitting the installation of the actuator as a unit. The bolts 40 are used to secure the actuator assembly to the valve body 20 and mounting plate 42. Once the bolts 40 are tightened, the spring-force from spring 62 is removed from the snap wings 34 and distributed among the bolts 40. The mounting plate 42 may then be snapped into position on the valve mounting bracket 40.

The valve mounting bracket 40 is a molded, or machined, plastic piece that is designed to mate with and secure the mounting plate 42, and thereby secure the valve 20 and actuator assembly 30 in place. Although the mounting bracket 40 is shown as a generally rectangular unit in the Figures, one skilled in the art would appreciate how to modify the bracket to accommodate valves and valve mounting plates of different shapes. The mounting bracket 40 may be made of any suitable molded material, including polypropylene, perfluoroalkoxy, or polyvinylidenfluoride.

The valve mounting bracket 40 comprises a base plate 70, a retaining clip 72, and a snap wing 74. The base plate 70, is generally rectangular shaped to conform to or otherwise fit the mounting plate 42, although other geometries may be used. Support side walls 76, which raise above the top surface 78 of the base plate 70, may be added to provide strength and durability to the mounting bracket 40. In one embodiment, the side walls do not continue all the way around the bracket, but instead have a break point, typically towards the center of the bracket. Such an embodiment functions to provide a mating fit with the mounting plate 42 and to provide easier access to valve inlet and outlet ports, 77a and 77b respectively.

The top surface 78 of the base plate 70 contains a set of screw holes 80 for mounting the bracket. In the embodiment shown in FIGS. 6–8, two screw tabs 82 located on the mounting plate 42 to allow the valve to be secured with the use bracket. In another embodiments, three or more screw tabs 82 are employed. In one embodiment, a flow direction indicator 85 is placed on the mounting bracket 40 to indicate the direction of the flow through the valve, and hence the proper installation orientation. In the embodiment in FIGS. 6–8, the flow direction indicator 85 is an arrow that is placed on the top surface 78 of the mounting bracket, and upon assembly points in the same direction of flow as indicated by the valve direction indicator 87.

The retaining clip 72 is formed on a first side 88 of the top surface 78 of the mounting bracket. The retaining clip 72 has a opening 90 in the rear 92 of the retaining clip 72 for engagement and retention of tab 94 located on the mounting plate 42. In one embodiment, the tab 94 has a gusset 96 to provide strength and support of the tab 94. In such an embodiment, the retaining clip 72 contains a cut-out portion 96 along the top surface 98 to allow easy insertion and removal of the tab 94.

The snap wing 74 is a molded plastic tab that protrude from the top surface 78 of the mounting bracket 40 and positioned received wedge 100 locate on one side of the mounting plate 42. The snap wing 74 is generally planar with a hook 102 at the top end 104 that rests along the top ridge 106 of the wedge 100 when the valve is moved into the secured position. While the snap wing 74 may be a variety of sizes, a longer snap wing is more flexible thereby allowing the snap-wing to be released more easily. Thus, in one embodiment the snap wing 74 originates along the top surface 78 of the mounting bracket and curves down towards the bottom of the mounting bracket before curving back up towards the valve assembly through opening 108 in the mounting bracket.

Figure 6:
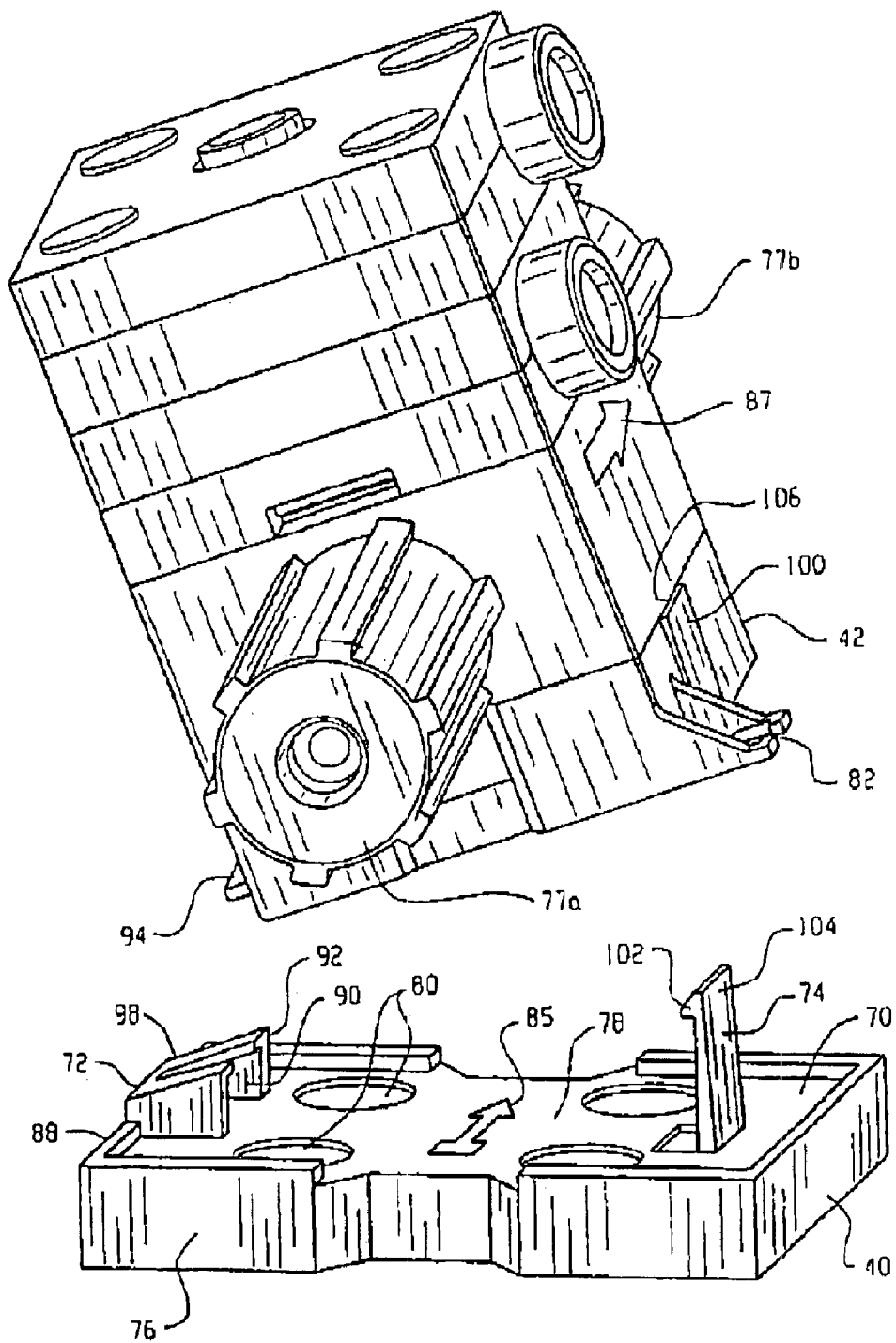
FIG. 6 is a valve mounting bracket and valve assembly prior to engagement.
Figure 7:
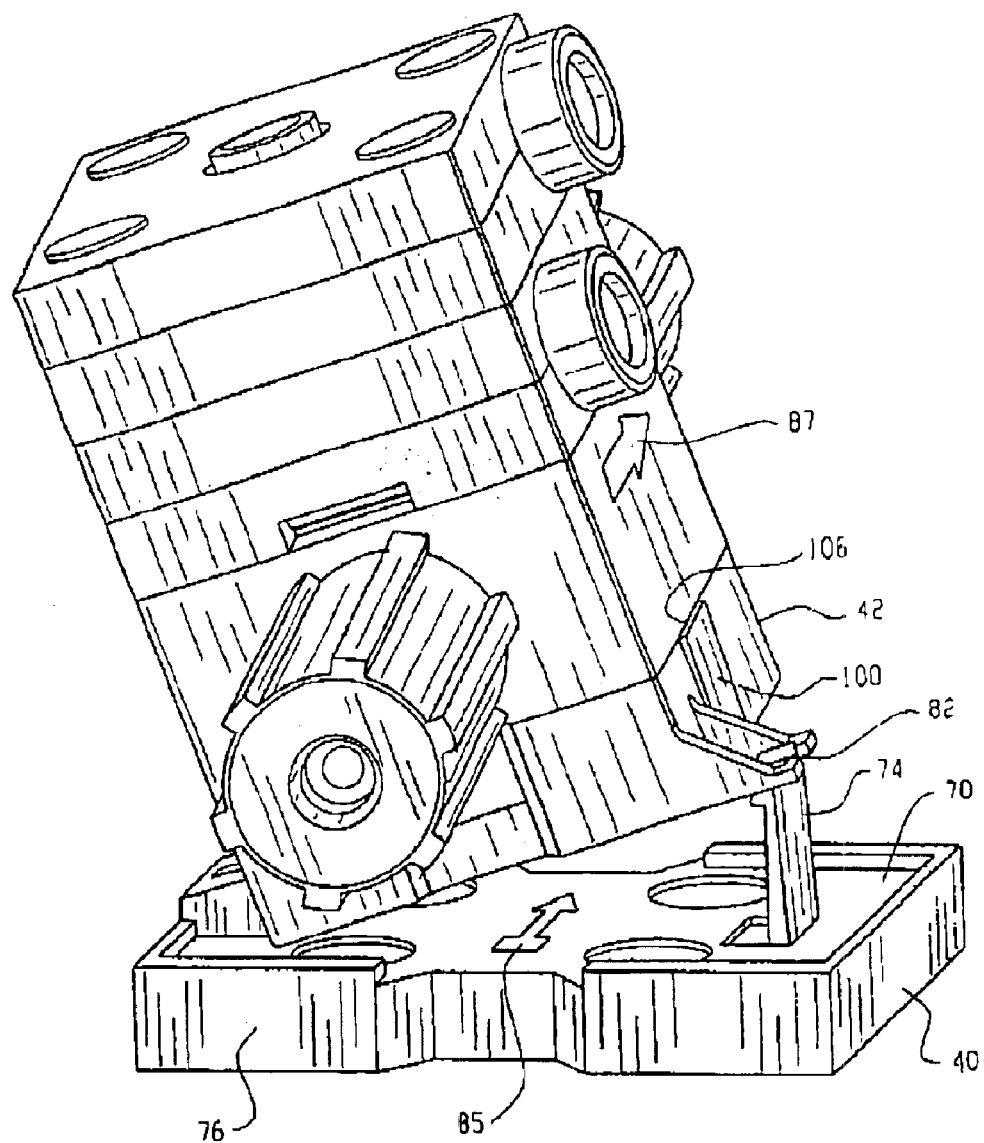
FIG. 7 is a partially engaged valve mounting bracket and valve assembly.
Figure 8:
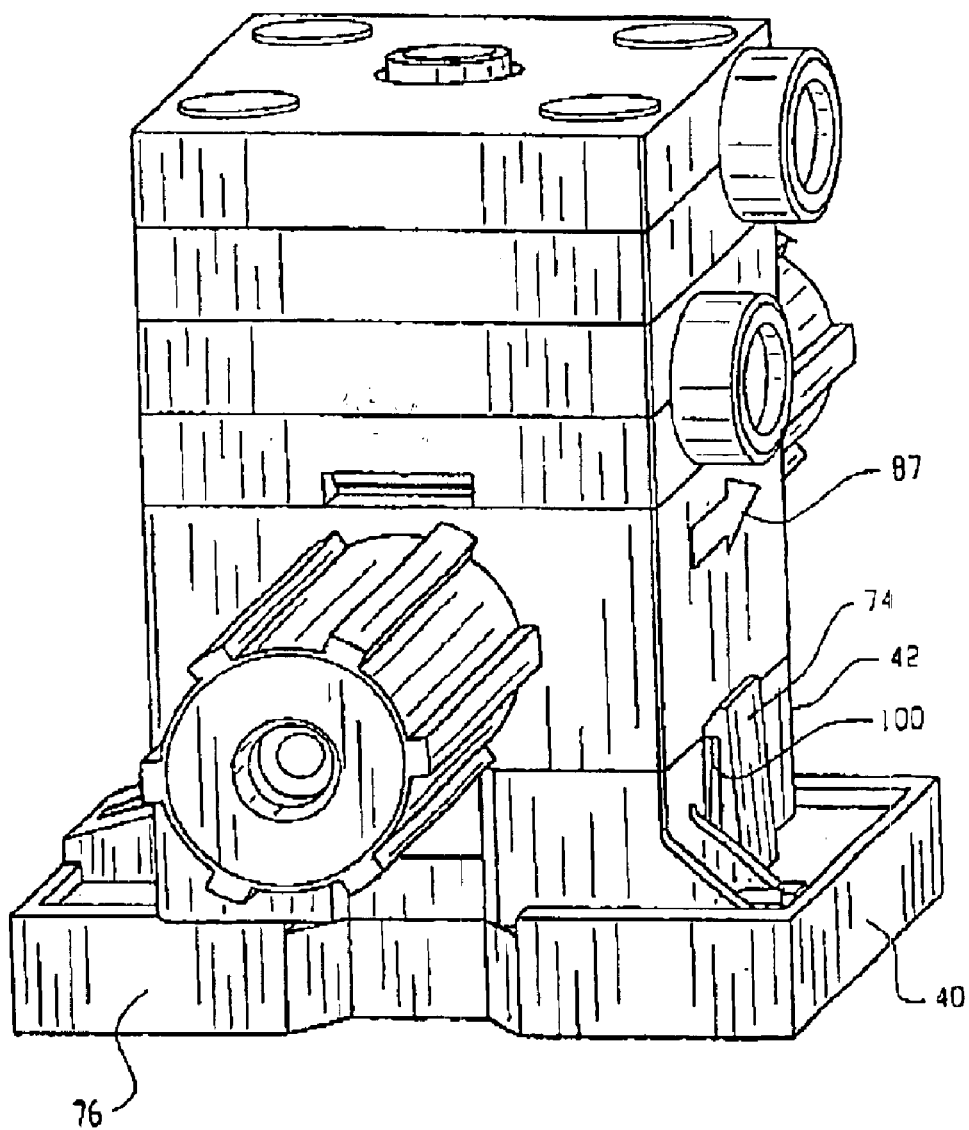
FIG. 8 is a valve mounting bracket and valve assembly in interlocking engagement.

As shown in FIGS. 6–8, to mount the valve body 20 and mounting plate 42 to the valve mounting bracket 40, the valve body and mounting bracket are brought toward the mounting bracket at an angle towards the retaining clip 72 and in the direction as indicted by the respective flow direction indicators 85 and 87. The tab 94 is inserted into the retaining clip 72 and then the other side of the valve body is brought towards the mounting bracket. The snap wing 74 slides along wedge 100 until the hook 102 secures against the top ridge 106 of the wedge 100. The size of the snap wing 74 and the wedge 100 should be such that when the hook 102 is secured against the top ridge 106 of the wedge 100, the bottom surface of the mounting plate 42 rests substantially flat against the top surface 78 of the valve mounting bracket 40.

Figure 9B:
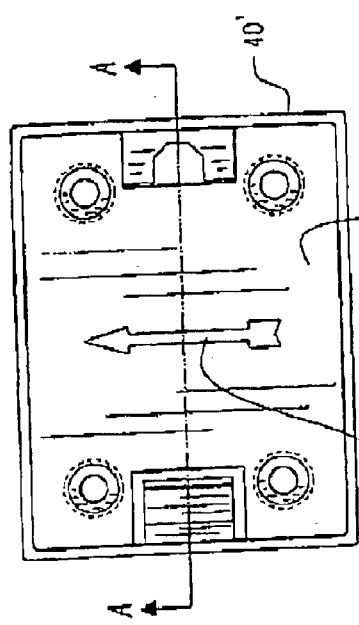
FIG. 9B is a top view of the valve mounting bracket shown in FIG. 9A.
Figure 9C:
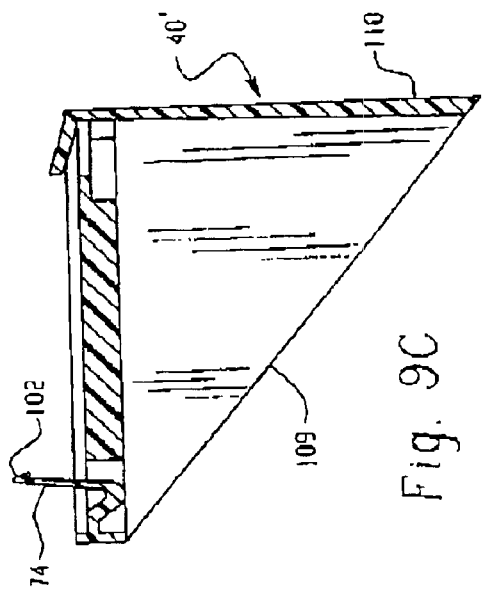
FIG. 9C is a cross-sectional view of FIG. 9B taken through A—A.
Figure 9A:
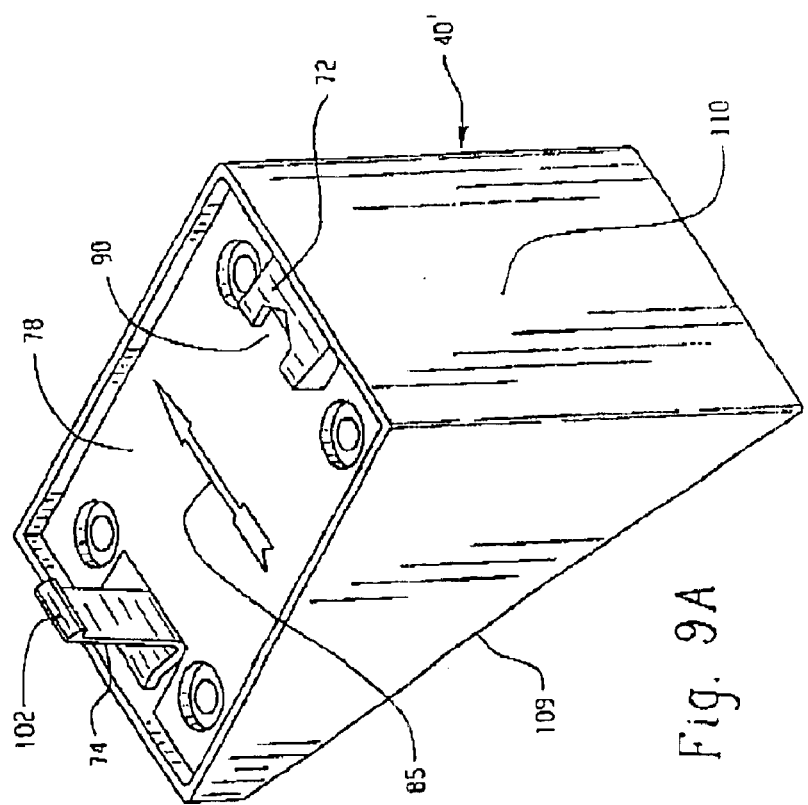
FIG. 9A is an isometric view of another embodiment of the valve mounting bracket.

The valve mounting bracket 40 described above may be used in connection with a variety of manual and pneumatic valves. In the embodiment shown in FIGS. 9A–C, the mounting bracket 40' is configured for mounting a valve at an angle. In order to accommodate such a mounting orientation, the bottom surface 109 of the mounting bracket is angled by providing a longer mounting bracket side surface 110. By allowing the valve to be mounted at an angle, the mounting bracket described herein may be employed for a variety of weir valves. As an illustrative example, the angle α may be approximately 50° which is typically optimal for draining weir valves. One skilled in the art would appreciate that other desired angles could be obtained by varying the length of the mounting bracket side surface 109.

The valve mounting bracket 40 may be used, either in conjunction with the snap assembly valve actuator 30 or by itself, to provide for a method of designing, modifying, and repairing a fluid flow system. Since the valve mounting bracket 40 may be easily installed and subsequently moved to different positions within the fluid flow system, designing new systems and modifying existing systems can be accomplished with relative ease. This is important as frequently a designer must design the fluid flow system around existing structures and/or modify the fluid flow system to add a line, remove a line, change the flow path, or otherwise modify the piping of the system. Additionally, use of the valve mounting bracket 40 facilitates easy removal of a valve from a system. This saves time and cost when valves must be removed, added, relocated, or taken out for replacement or repair. Combining the valve mounting bracket 40 with the snap assembly valve actuator 30 provides for further ease of assembly of a fluid flow system.

While the specification has generally described a mounting bracket for a valve, one skilled in the art will appreciate that the bracket can be employed to secure other devices. For example, a mounting bracket can be designed to secure a manifold, a flow metering device or other fluid flow system devices.

Although the invention has been disclosed and described with respect to certain preferred embodiments, certain variations and modifications may occur to those skilled in the art upon reading this specification. Any such variations and modifications are within the purview of the invention notwithstanding the defining limitations of the accompanying claims and equivalents thereof. Accordingly, departures may be made from such details without departing from the spirit or scope of the applicant's general inventive concept.

What is claimed is:

1. A valve mounting bracket comprising:
    a mounting bracket base plate;
    a retaining clip positioned on said mounting bracket base plate;
    a snap wing positioned on said mounting bracket base plate;
    wherein a valve is mounted onto said valve mounting bracket in a snap together engagement by utilizing both said retaining clip and said snap wing.

2. The valve mounting bracket of claim 1, wherein said snap wing is positioned to engage a member located on said valve for retaining said valve to said valve mounting bracket.

3. The valve mounting bracket of claim 1, further comprising a set of one or more screw holes.

4. The valve mounting bracket of claim 1, wherein said valve mounting bracket mates with a corresponding valve mounting plate.

5. The valve mounting bracket of claim 4, wherein said snap wing engages a surface of a wedge portion of said valve mounting plate.

6. The valve mounting bracket of claim 4, wherein said retaining clip is positioned to receive a tab located on said valve mounting plate in a first opening.

7. The valve mounting bracket of claim 6, wherein said retaining clip further comprises a second opening for receipt of a gusset located on said tab.

8. The valve mounting bracket of claim 1, wherein said snap wing is molded to the top portion of said valve mounting base plate, curves downward towards the underside of said base plate, and then curves back upward towards the valve mounting plate passing through a cutout portion of said base plate.

9. The valve mounting bracket of claim 1, wherein said bracket is comprised of molded plastic.

10. The valve mounting bracket of claim 9, wherein said bracket is polypropylene, perfluoroalkoxy, or polyvinylidenfluoride.

11. The valve mounting bracket of claim 1, wherein said valve mounting base plate is angled thereby angling the valve upon mounting.

12. The valve mounting bracket of claim 11, wherein said valve mounting base plate is angled at approximately 50 degrees.

13. The valve mounting bracket of claim 1, further comprising a flow direction indicator.

14. The valve mounting bracket of claim 3, wherein said screw holes are aligned with a set of one or more screw tabs located on a valve mounting plate.

15. A method of creating a fluid flow system comprising the steps of:
   positioning one or more valve mounting brackets with a fluid flow system;
   securing the valve mounting brackets;
   attaching a valve to each of said valve mounting brackets via a conjunctive snap-together engagement mechanism utilizing both a tab-retaining clip engagement and snap wing-wedge engagement.

16. The method of claim 15, wherein said snap-together engagement mechanism comprises a snap wing positioned on the valve mounting bracket for engagement with a member located on the valve.

17. The method of claim 15, further comprising the step of selectively removing one or more of said valves for repair, maintenance, replacement, removal or relocation.

18. A method of securing a valve comprising the steps of:
   securing said valve to a valve mounting bracket;
   engaging a tab on said valve into a retaining clip on said valve mounting bracket; and
   engaging a surface of a wedge portion on said valve with a snap wing on said valve mounting bracket in a snap-together engagement.

19. The method of claim 18, wherein said valve includes a separable valve mounting plate which mates with said valve mounting bracket.

20. The method of claim 19, wherein securing said valve to said valve mounting bracket comprises just bringing said tab on said valve mounting plate in at an angle for engagement with said retaining clip on said valve mounting bracket and then with said tab and said retaining clip engaged, bringing said surface of said wedge portion on said valve mounting plate closer to said snap wing on said valve mounting bracket until said snap wing engages said surface of said wedge portion in a snap-together engagement, with a ridge on said snap wing and said retaining clip conjunctively securing said valve to said valve mounting bracket.

21. A valve mounting bracket comprising:
   a mounting bracket base plate;
   a retaining clip positioned on said mounting bracket base plate;
   a snap wing positioned on said mounting bracket base plate;
   wherein a valve is mounted onto said valve mounting bracket in a snap together engagement by utilizing both said retaining clip and said snap wing; and
   wherein said snap wing is molded to the top portion of said valve mounting base plate, curves downward towards the underside of said base plate, and then curves back upward towards the valve mounting plate passing through a cutout portion of said base plate.

22. A valve mounting bracket comprising:
   a mounting bracket base plate;
   a retaining clip positioned on said mounting bracket base plate;
   a snap wing positioned on said mounting bracket base plate;
   wherein a valve is mounted onto said valve mounting bracket in a snap together engagement by utilizing both said retaining clip and said snap wing; and
   wherein mounting said valve to said valve mounting bracket comprises first bringing a tab on said mounting bracket base plate in at an angle for engagement with said retaining clip on said valve mourning bracket and then with said tab and said retaining clip engaged, bringing a surface of a wedge portion on said mounting bracket base plate closer to said snap wing on said valve mounting bracket until said snap wing engages said surface of said wedge portion in a snap-together engagement, with a ridge on said snap wing and said retaining clip conjunctively securing said valve to said valve mounting bracket.

23. A valve mounting bracket comprising:
   a mounting bracket base plate including an arched portion defined by a central open region for operable mating with a tab located on a valve and a flexible member with retaining ridge formed on the mounting bracket for securing a surface of a wedge shaped portion located on said valve;
   wherein said valve is mounted onto said valve mounting bracket in a snap together engagement by utilizing both said arched portion and said flexible member; and
   wherein mounting said valve to said valve mounting bracket comprises first bringing said tab on said valve in at an angle for engagement with said arched portion on said valve mounting bracket and then with said tab and said arched portion engaged, bringing said surface of said wedge portion on said valve closer to said flexible member on said valve mounting bracket until said flexible member engage said surface of said wedge portion in a snap-together engagement, with said retaining ridge on said flexible member and said arched portion conjunctively securing said valve to said valve mounting bracket.

24. A valve mounting bracket
   a mounting bracket base plate including an arched portion defined by a central open region for operable mating with a tab located on a valve and a flexible member with retaining ridge formed on the mounting bracket for securing a surface of a wedge shaped portion located on said valve;
   wherein said valve is mounting onto said valve mounting bracket in snap together engagement by utilizing both said arched portion and said flexible member.

* * * * *